United States Patent
Ogahara

(10) Patent No.: US 8,212,504 B2
(45) Date of Patent: Jul. 3, 2012

(54) CONDUCTION ANGLE CONTROL OF BRUSHLESS MOTOR

(75) Inventor: Hideharu Ogahara, Shiga (JP)

(73) Assignee: Panasonic Corporation, Osaka (JP)

( * ) Notice: Subject to any disclaimer, the term of this patent is extended or adjusted under 35 U.S.C. 154(b) by 204 days.

(21) Appl. No.: 12/594,261

(22) PCT Filed: Dec. 2, 2008

(86) PCT No.: PCT/JP2008/003549
§ 371 (c)(1),
(2), (4) Date: Oct. 1, 2009

(87) PCT Pub. No.: WO2009/075071
PCT Pub. Date: Jun. 18, 2009

(65) Prior Publication Data
US 2010/0237809 A1    Sep. 23, 2010

(30) Foreign Application Priority Data
Dec. 10, 2007  (JP) .................. 2007-318150

(51) Int. Cl.
*H03K 5/00* (2006.01)

(52) U.S. Cl. ......... 318/400.13; 318/400.34; 318/400.35; 318/400.37; 318/400.38

(58) Field of Classification Search ............. 318/400.13, 318/400.34, 400.35, 400.37, 400.38
See application file for complete search history.

(56) References Cited

U.S. PATENT DOCUMENTS

| | | | |
|---|---|---|---|
| 5,804,939 A | 9/1998 | Yamai et al. | |
| 6,512,341 B2 * | 1/2003 | Matsushiro et al. | ..... 318/400.07 |
| 7,755,308 B2 * | 7/2010 | Kayikci et al. | ................ 318/139 |
| 2002/0030462 A1 | 3/2002 | Matsushiro et al. | |
| 2002/0140395 A1 | 10/2002 | Tazawa et al. | |

FOREIGN PATENT DOCUMENTS

| | | |
|---|---|---|
| JP | 64-008890 | 1/1989 |
| JP | 2006-174643 A | 6/2006 |
| JP | 2006-174665 A | 6/2006 |
| JP | 2006-180651 A | 7/2006 |
| JP | 2007-104861 A | 4/2007 |
| JP | 2007-209153 A | 8/2007 |
| JP | 2007-221867 A | 8/2007 |
| WO | WO 95/27328 | 10/1995 |

OTHER PUBLICATIONS

European Office Action for Application No. 08859612.7, May 25, 2010, Panasonic Corporation.
International Search Report for International Application No. PCT/JP2008/003549, Jul. 15, 2009, Panasonic Corporation.

* cited by examiner

*Primary Examiner* — Walter Benson
*Assistant Examiner* — Erick Glass
(74) *Attorney, Agent, or Firm* — RatnerPrestia

(57) ABSTRACT

An inverter controller for driving a brushless DC motor, of which rotor is provided with permanent magnets, includes an inverter circuit, a position sensing circuit, a DC voltage sensor, and a conduction angle controller. The inverter circuit is connected to the brushless DC motor for driving this motor. The position sensing circuit senses a rotor position with respect to a stator from an induction voltage of the brushless DC motor. The DC voltage sensor senses a voltage value of a DC power voltage supplied to the inverter circuit. The conduction angle controller changes a conduction angle of the inverter circuit within a range less than 180 degrees in electric angles in response to a rate of change in the DC power voltage.

12 Claims, 11 Drawing Sheets

US 8,212,504 B2

CONDUCTION ANGLE CONTROL OF BRUSHLESS MOTOR

This application is a U.S. National Phase application of PCT International Application PCT/JP2008/003549.

TECHNICAL FIELD

The present invention relates to a wide-angle conduction control method employed in an inverter controller for a brushless DC motor, and it also relates to motor driving devices, electric compressors, electric home appliances such as a refrigerator, using the inverter controller.

BACKGROUND ART

As control over the waveform of an inverter, 120-degree conduction waveforms is generally adopted from the viewpoint of simplicity in control. In a driving system for a brushless DC motor, switches of respective phases of the inverter are electrically conducted within 120 degrees in electrical angles although the electrical angle is spanned as wide as 180 degrees both on positive side and negative side respectively. No control is thus done in the remaining period of 60 degrees in electrical angles. During this non-controlled period, the inverter fails to output a desired voltage, so that the inverter uses the DC voltage at a low utilization rate. This low utilization rate causes a low voltage between the respective terminals of the brushless DC motor as well as narrows the working range of the inverter. The maximum rotational speed of the DC motor is thus obliged to be low.

On the other hand, a wide-angle control method, which widens an electrically conduction angle to over 120 degrees in electrical angles, is proposed because this method allows enlarging the working range of the inverter for increasing an output of the inverter controller (e.g. refer to Patent citation 1, for instance). Patent citation 1 discloses that a conduction range of a voltage-type inverter is set at a given range over 120 degrees and not greater than 180 degrees in electrical angles, so that a non-controlled period becomes as small as less than 60 degrees in electrical angles. As a result, the voltages between the respective terminals of the motor become greater, which widens the working range of the inverter.

In recent years, permanent magnets are embedded in a rotor to generate torque caused by reluctance in addition to torque caused by magnets for obtaining higher efficiency. This brushless DC motor allows increasing the torque without a need for increasing a motor current.

To use this reluctance torque more efficiently, a voltage phase of the inverter is advanced with respect to an induction-voltage phase of the motor. This is called a phase-advancing control method, which can also efficiently use a weak magnetic flux, thereby increasing output-torque.

A compressor employs an inverter controller which uses no sensors such as a Hall element, from the viewpoints of service condition, reliability and maintenance. The inverter controller employs a sensor-less method in which a pole position of a rotor is sensed from an induction voltage generated in stator windings. This sensor-less method uses the span of 60 degrees in electrical angles, i.e. the non-controlled period, and monitors induction voltages available at the respective terminals of the motor during the switch-off of the upper and lower arms, thereby sensing the pole position of the rotor.

A conventional inverter controller is described hereinafter with reference to the accompanying drawings. FIG. 7 shows a structure of the conventional inverter, and FIG. 8 shows characteristics of torque vs. rotational speed of the conventional inverter. Specifically, it shows the characteristics of wide-angle control. FIG. 8 tells that the maximum rotational speed increases at a wider conduction angle provided when the torque is kept at a constant level.

FIG. 9 shows timing charts of the signal waveforms of respective sections of the conventional inverter controller. The timing charts also indicate the processes of the respective sections and the characteristics at conduction angle of 150 degrees in electrical angles. In FIG. 7, three pairs of switching transistors connected in series, i.e. Tru and Trx, Try and Try, Trw and Trz are coupled between the terminals of DC power supply 001, thereby forming inverter circuit 002. Brushless DC motor 003 is formed of stator 003A and rotor 003B. Stator 003A is formed of four poles and distributed windings. Rotor 003B is an interior magnet type where permanent magnets 003N and 003S are embedded.

The connection points of respective pairs of the switching transistors are coupled to brushless DC motor 003 at respective terminals of stator windings 003U, 003V, and 003W of respective phases, forming a "wye" connection. The connection points of respective pairs of the switching transistors are also coupled to respective resistors 004U, 004V, and 004W forming a "wye" connection. Reflux diodes Du, Dx, Dv, Dy, Dw, and Dz are coupled between the collector and the emitter of respective switching transistors Tru, Trx, Trv, Try, Trw, and Trz, for a protection purpose.

Pole-position sensing circuit 010 is formed of differential amplifier 011, integrator 012, and zero-crossing comparator 013. A voltage at neutral point 003D of stator windings 003U, 003V, and 003W coupled together in the wye connection is supplied to an inverting input terminal of amplifier 011B via resistor 011A. A voltage at neutral point 004D of resistors 004U, 004V, and 004W coupled together in the wye connection is supplied directly to non-inverting input terminal of amplifier 011B. Resistor 011C is coupled between an output terminal and the non-inverting input terminal of amplifier 011B. Differential amplifier 011 is thus formed.

An output signal from the output terminal of differential amplifier 011 is supplied to integrator 012 formed of resistor 012A and capacitor 012B coupled together in series. An output signal from integrator 012 (i.e. a voltage at a connection point between resistor 012A and capacitor 012B) is supplied to a non-inverting input terminal of zero-crossing comparator 013.

A voltage at neutral point 003D is supplied to an inverting input terminal of zero-crossing comparator 013. An output terminal of zero-crossing comparator 013 outputs a pole-position sensing signal.

Differential amplifier 011, integrator 012 and zero-crossing comparator 013 form pole-position sensing circuit 010 which senses a pole position of rotor 003B of brushless DC motor 003. Pole-position sensing circuit 010 outputs the pole-position sensing signal to microprocessor 020. Microprocessor 020 then corrects the phases of the supplied pole-position sensing signal in order to measure a cycle, and set a phase advance angle as well as a conduction angle. Microprocessor 020 calculates a timer counting value per cycle of an electric angle for determining a commutation signal of respective switching transistors Tru, Trx, Trv, Try, Trw, and Trz.

Microprocessor 020 outputs a voltage instruction based on a rotational speed instruction, and performs pulse width modulation (PWM) to the voltage instruction. Microprocessor 020 controls a duty ratio, i.e. a ratio of ON vs. OFF of a PWM signal, based on a difference between the rotational speed instruction and an actual rotational speed, and outputs PWM signals for the three phases. Microprocessor 020 increases the duty ratio when the actual rotational speed is smaller than the rotational speed instruction, and reduces the duty ratio when the actual rotational speed is greater than the rotational speed instruction.

The PWM signal is supplied to driving circuit 030. Driving circuit 030 outputs driving signals to respective base terminals of switching transistors Tru, Trx, Trv, Try, Trw, and Trz.

A conduction work of the inverter controller discussed above is described hereinafter. In FIG. 9, induction voltages Eu, Ev, and Ew of phases U, V and W of brushless DC motor 003 vary while the respective phases shift by 120 degrees from each other. A differential amplifier output signal indicates a signal output from differential amplifier 011. A signal supplied from integrator 012 forms an integral waveform shaped by integrator 012. A supply of the integral waveform to zero-crossing comparator 013 prompts an output signal from zero-crossing comparator 013 to rise and then fall at the zero-crossing point of the integral waveform. This excitation switching signal is output as the pole-position sensing signal.

The rise and fall of the excitation switching signal prompt phase correction timer G1 to start, and the start of timer G1 prompts second phase correction timer G2 to start. Both of timers G1 and G2 advance inverter mode N, i.e. a commutation pattern, by one step.

A conduction timing of phase U can be calculated based on the induction voltage waveform of phase W, and an amount of phase advance of the inverter can be controlled by phase-correction timer G1. In FIG. 9, a phase advance angle is set at 60 degrees when conduction angle is 150 degrees in electric angles. Phase correction timer G1 thus counts a value corresponding to 45 degrees, and second phase correction timer G2 counts a value corresponding to 30 degrees in electric angles. As a result, the ON-OFF states of switching transistors Tru, Trx, Trv, Try, Trw, and Trz are controlled as shown in FIG. 9 in response to the respective inverter modes.

As discussed above, brushless DC motor 003 can be driven in a state where a conduction period is set between 120 degrees and 180 degrees, and a phase of inverter voltage can be advanced with respect to that of the induction voltage of the motor.

The rotation of rotor 003B generates an induction voltage at stator windings 003U, 003V, 003W, and the induction voltage can be sensed through the foregoing conventional structure. This induction voltage is shifted its phase by integrator 012 having a delay of 90 degrees, thereby sensing a position sensing signal corresponding to a magnetic pole of rotor 003B. Based on this position sensing signal, conduction timings to stator windings 003U, 003V, 003W are determined. Use of such integrator 012 as having a phase-delay of 90 degrees lowers the responsiveness to an abrupt acceleration or deceleration.

A position sensing circuit improved in responsiveness has been proposed (e.g. refer to Patent citation 2, for instance). Another conventional inverter controller disclosed in Patent citation 2 is described hereinafter with reference to the accompanying drawings. FIG. 10 shows a structure of another conventional inverter controller, and FIG. 11 shows timing charts of the signal waveforms of respective sections of the conventional inverter controller. The timing charts also indicate the processes of the respective sections.

In FIG. 10, resistors 101 and 102 are coupled in series between bus 103 and bus 104, and their common connection point, i.e. sensing terminal ON, supplies voltage VN of a virtual neutral point. Voltage VN is a half of the voltage of DC power supply 001, and the voltage of DC power supply 001 corresponds to a voltage of the neutral point of stator windings 105U, 105V, and 105W.

Respective non-inverting input terminals (+) of comparator 106A, 106B, and 106C are coupled to output terminals OU, OV, and OW via resistors 107, 108, and 109, respectively. Respective inverting input terminals (−) of the comparators are coupled to sensing terminal ON.

Respective output terminals of comparators 106A, 106B, and 106C are coupled to microprocessor 110, having a logic circuit therein, at its input terminals I1, I2, and I3. Outputs from output terminals 01 through 06 of microprocessor 110 drive switching transistors Tru, Trx, Trv, Try, Trw, and Trz via driving circuit 120.

Brushless DC motor 105 includes four poles and distributed windings. Rotor 105A forms a structure of surface mounted magnet, i.e. permanent magnets 105N and 105S are mounted to the surface of rotor 105A. Motor 105 is thus set in a state where conduction angle is set at 120 degrees and phase advance angle is set at 0 degree in electric angles.

The structure is further described with reference to FIG. 11. Terminal voltage Vu, terminal voltage Vv, and terminal voltage Vw indicate respectively the voltages across stator windings 105U, 105V, and 105W during a regular operation of motor 105. Assume that inverter circuit 140 supplies voltages Vua, Vva, and Vwa, and stator windings 105U, 105V, and 105W generate induction voltages Vub, Vvb, and Vwb. Assume that a conduction, occurring at an event of commutation switch, of any one of reflux diodes Du, Dx, Dv, Dy, Dw, or Dz of inverter circuit 140 will generate pulse-like spike voltages Vuc, Vvc, and Vwc. Then respective terminal voltages Vu, Vv, Vw form a waveform combined by supplied voltages Vua, Vva, Vwa, induction voltages Vub, Vvb, Vwb, and spike voltages Vuc, Vvc, Vwc respectively.

Output signals PSu, PSv, PSw from the comparators indicate the results of comparison done by comparators 106A, 106B, 106C between terminal voltages Vu, Vv, Vw and voltage VN at the virtual neutral point. In this case, output signals PSu, PSv, PSw are formed of signals PSua, PSva, PSwa which indicate a positive-negative and a phase of each one of induction voltages Vub, Vvb, Vwb, and output signals PSub, PSvb, PSwb corresponding to spike voltages Vuc, Vvc, Vwc.

Spike voltages Vuc, Vvc, Vwc are neglected by a wait-timer, so that output signals PSu, PSv, PSw indicate a positive-negative and a phase of each one of induction voltages Vub, Vvb, Vwb, as a result.

Microprocessor 110 recognizes six modes, A, B, C, D, E, and F as shown in the mode column based on the status of signals PSu, PSv, PSw output from the comparators, and then it outputs driving signals DSu through DSz with a delay of 30 degrees in electric angles from the instant of variation in levels of output signals PSu, PSv, PSw. Respective time T of each mode A through F indicates 60 degrees, and a half of the time of each mode A through F, i.e. T/2, indicates a delay time corresponding to 30 degrees in electric angles.

Microprocessor 110 thus senses the rotational position of rotor 105A of motor 105 based on the induction voltages generated at stator windings 105U, 105V, 105W in response to the rotation of rotor 105A. It also determines driving signals for the conduction to stator windings 105U, 105V, 105W, depending on the conduction mode and the timing, by detecting the variable time T of the induction voltages, and then supplies electricity to stator windings 105U, 105V, and 105W.

The foregoing structure thus differs from the conventional inverter controller disclosed in Patent citation 1, and since it needs no filter circuit, it can detect an induction voltage with higher sensitivity. As a result, starting characteristic can be improved, and the motor can be driven at a lower rotational speed. On top of that, since no filter circuit having a delay of 90 degrees is used, the motor can be controlled with a delay of as small as 30 degrees by combining first timer 122 and second timer 123. The responsiveness to an abrupt acceleration or deceleration can be thus improved.

Next, out-of-synchronous characteristics of voltages and conduction angles of an inverter controller is described hereinafter with reference to FIG. 12. FIG. 12 shows the out-of-synchronous characteristics of the voltages and the conduction angles of the inverter controller shown in FIG. 10. As FIG. 12 shows, in the case of a sharp fall of the voltage, a resistance to the out-of-synchronous decreases at a greater conduction angle. Characteristics similar to this one can be also observed when the voltage sharply rises.

Patent citation 1 proposes magnetic-pole-position sensing circuit 010 operable within a period of 180 degrees in electric angles. However, since circuit 010 employs a filter, a delay of 90 degrees in electric angles occurs, which causes a lower responsiveness to a variation in rotational speed such as an abrupt change in load. As a result, the motor sometimes falls in out-of-synchronous and halts its work.

Patent citation 2 proposes a position sensing circuit free from a delay of 90 degrees in electric angles. However, even this structure sometimes cannot sense the pole-position during a rotational variation, such as an abrupt change in load, and thus the motor may fall in out-of-synchronous. Such a phenomenon occurs in the following cases: (1) when wide-angle control which widens a conduction angle to over 120 degrees is carried out, (2) when phase-advance-angle control is carried out, this control method advances a voltage phase of the inverter with respect to a phase of the induction voltage of the motor, (3) when a width of the spike voltage is widened in order to obtain a higher efficiency by increasing an inductance through a greater number of turns of stator windings 105U, 105V, 150W. These cases incur a shorter position sensible period.

In the case of employing a concentrated winding in a stator of the motor in order to obtain a higher efficiency and to increase greater torque, when six poles are used instead of four poles, the position sensible period decreases to as small as ⅔ mechanical angles comparing with the case of using four poles. Therefore, the foregoing wide-angle control, the phase-advance-angle control, the increase in the number of turns, or the increase in the number of poles for incurring the shorter mechanical position sensible range, shortens the pole-position sensible period. Thus an occurrence of a variation in load, an instantaneous power interruption, or a variation in voltage will accompany an abrupt variation in rotation, so that the inverter controller fails to sense the pole position and the motor falls in the out-of-synchronous.

[Patent Citation 1]
International Publication Pamphlet No. 95/27328
[Patent Citation 2]
Japanese Patent Unexamined Publication No. H01-8890

DISCLOSURE OF INVENTION

The present invention provides a reliable inverter controller which changes instantaneously a conduction angle in response to a change in voltage of a DC voltage section, thereby preventing a brushless DC motor from falling in out-of-synchronous and stopping its work due to an instantaneous power interruption or an abrupt change in voltage. The present invention also provides motor driving devices, electric compressors, and electric home appliances using the inverter controller. The inverter controller of the present invention drives a brushless DC motor, of which rotor includes permanent magnets. The inverter controller has an inverter circuit, a position sensing circuit, a DC voltage sensor, and a conduction angle controller. The inverter circuit is coupled to and drives the brushless DC motor. The position sensing circuit senses a position of the rotor with respect to a stator from an induction voltage of the brushless DC motor. The DC voltage sensor senses a voltage supplied to the inverter circuit. The conduction angle controller changes a conduction angle of the inverter circuit in response to a rate of change in the voltage supplied from the DC power supply within the range lower than 180 degrees in electric angles. When a rotational speed of the motor changes due to an abrupt change in voltage caused by, e.g. an instantaneous power interruption, the structure described above allows reducing the conduction angle, thereby enlarging a position sensible period. The foregoing structure thus prevents the inverter controller from losing the pole position of the rotor. As a result, the inverter controller improves its responsiveness to changes in the rotational speed caused by voltage variation, prevents the motor from falling in the out-of-synchronous caused by the voltage variation, and improves the resistance to the instantaneous power interruption.

BRIEF DESCRIPTION OF DRAWINGS

FIG. 2 is a timing chart showing waveforms of respective sections in the inverter controller shown in FIG. 1 and the processes done by the respective sections.
FIG. 3 shows characteristics indicating the relation between conduction angles and variations in a power supply voltage of the inverter controller shown in FIG. 1.
FIG. 4 is a timing chart showing operation of the inverter controller shown in FIG. 1 when a voltage changes therein.
FIG. 5 is a block diagram of an electric compressor that employs the inverter controller shown in FIG. 1.
FIG. 6 is schematically a sectional view of a refrigerator as an example of electric home appliances that employ the compressor shown in FIG. 5.
FIG. 7 shows a structure of a conventional inverter controller.
FIG. 8 shows characteristics of torque vs. rotational speed of the inverter controller shown in FIG. 7.
FIG. 9 is a timing chart showing waveforms of respective sections of the inverter controller shown in FIG. 7 and the processes done by the respective sections.
FIG. 10 shows a structure of another conventional inverter controller.
FIG. 11 is a timing chart showing waveforms of respective sections of the inverter controller shown in FIG. 10 and the processes done by the respective sections.
FIG. 12 shows characteristics of out-of-synchronous caused by the relation between voltages and conduction angles of the inverter controller shown in FIG. 10.

BEST MODE FOR CARRYING OUT THE INVENTION

An exemplary embodiment of the present invention is demonstrated hereinafter with reference to the accompanying drawings. Not to mention, this embodiment does not limit the present invention.

Figure 1:
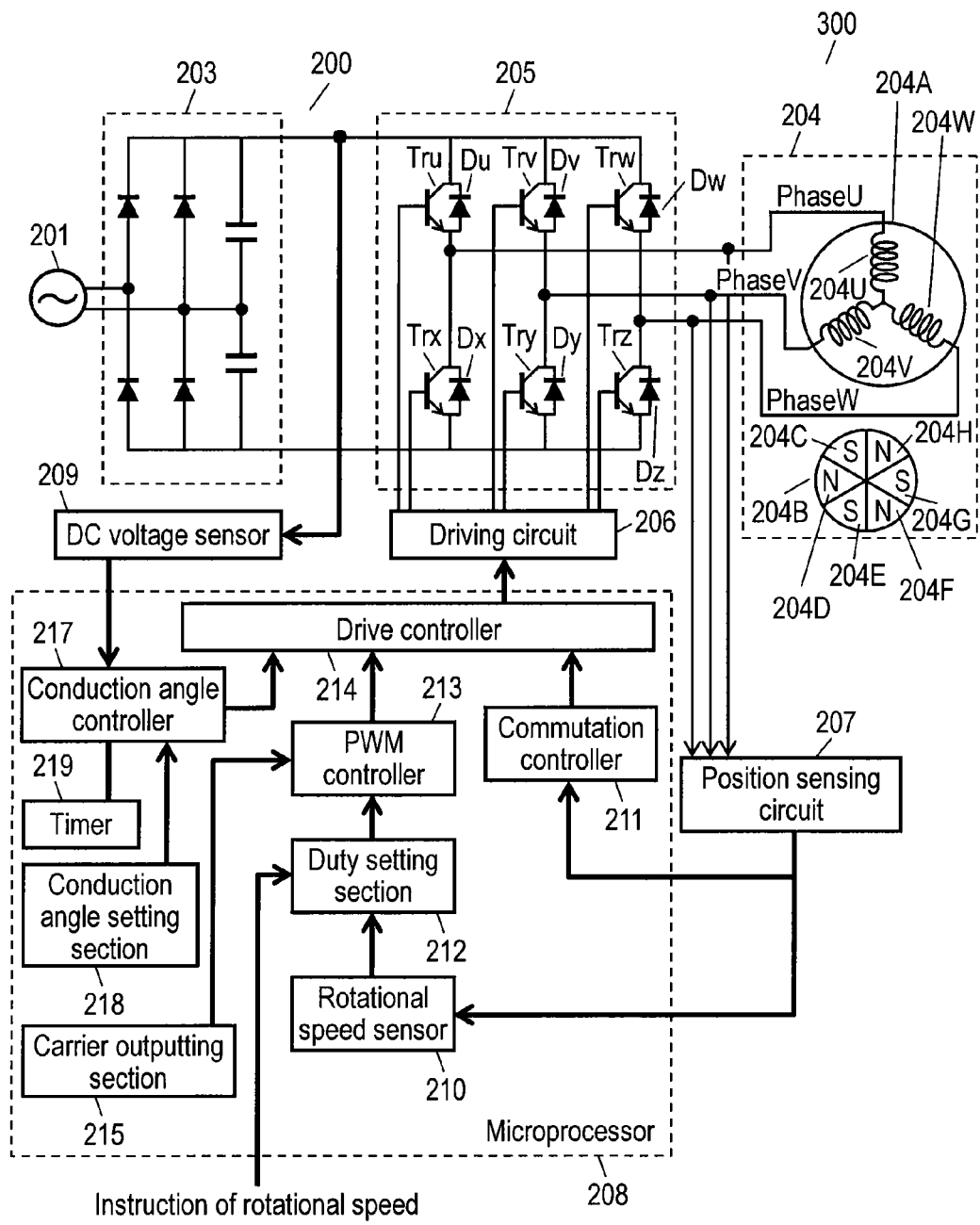
[FIG. 1]
[FIG. 1] shows a structure of an inverter controller in accordance with an embodiment of the present invention.
Figure 2:
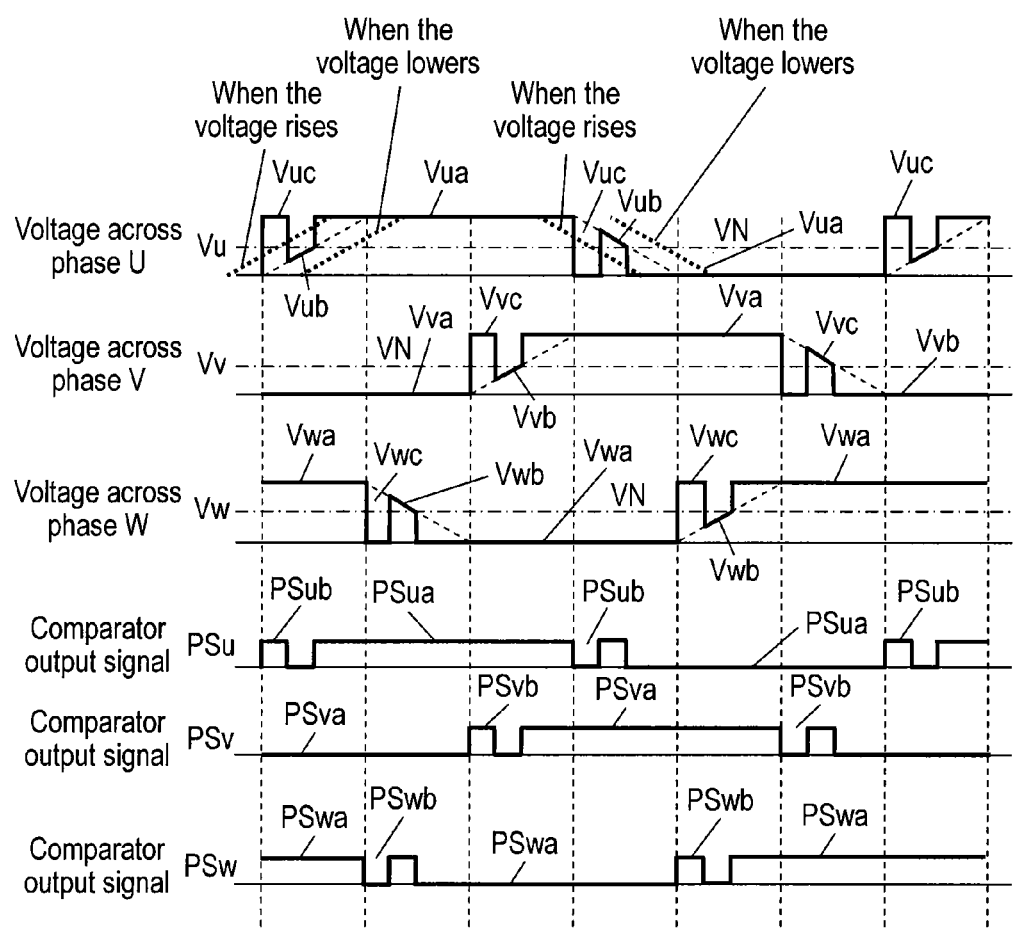
[FIG. 2]
Figure 3:
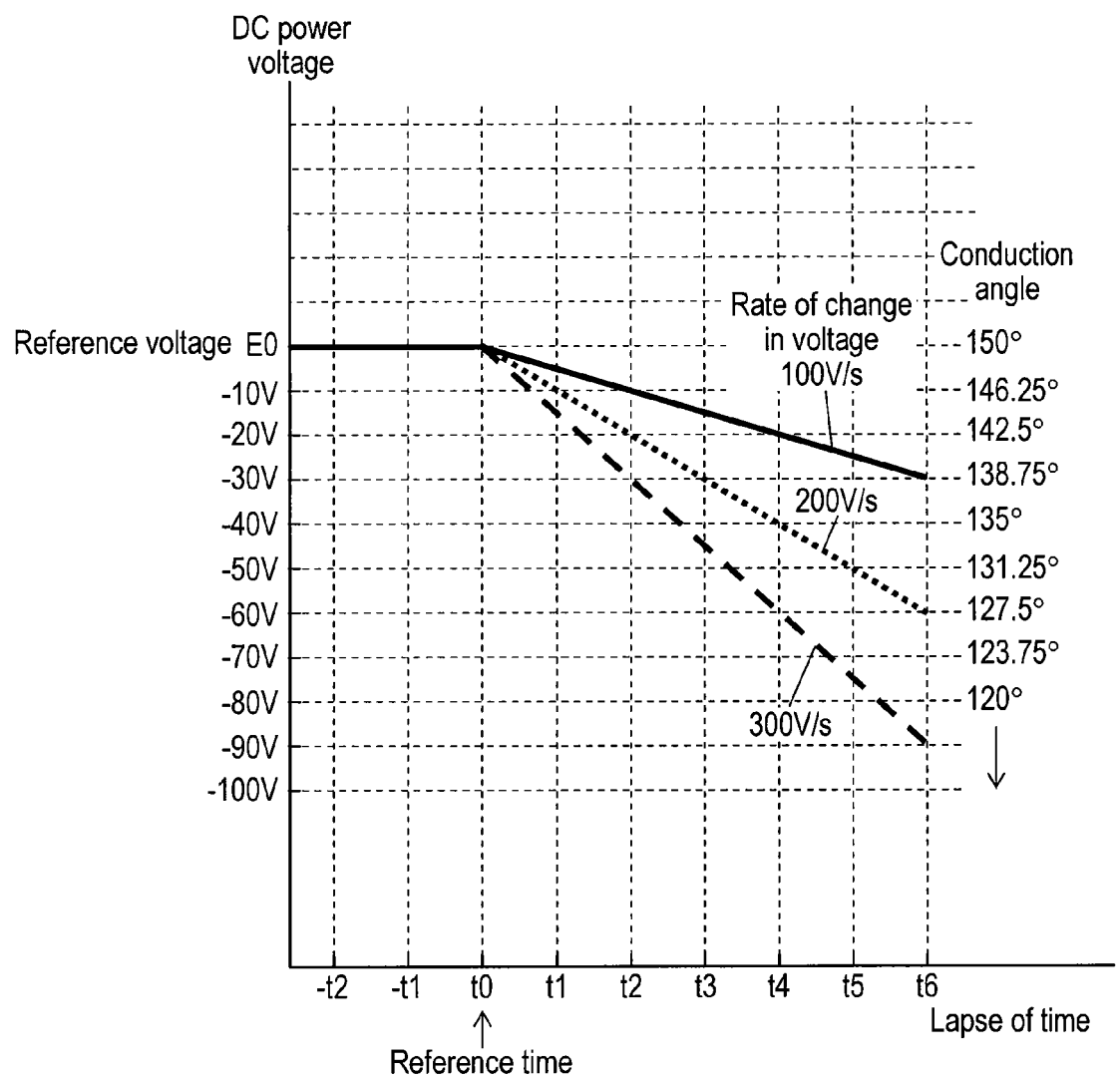
[FIG. 3]
Figure 4:
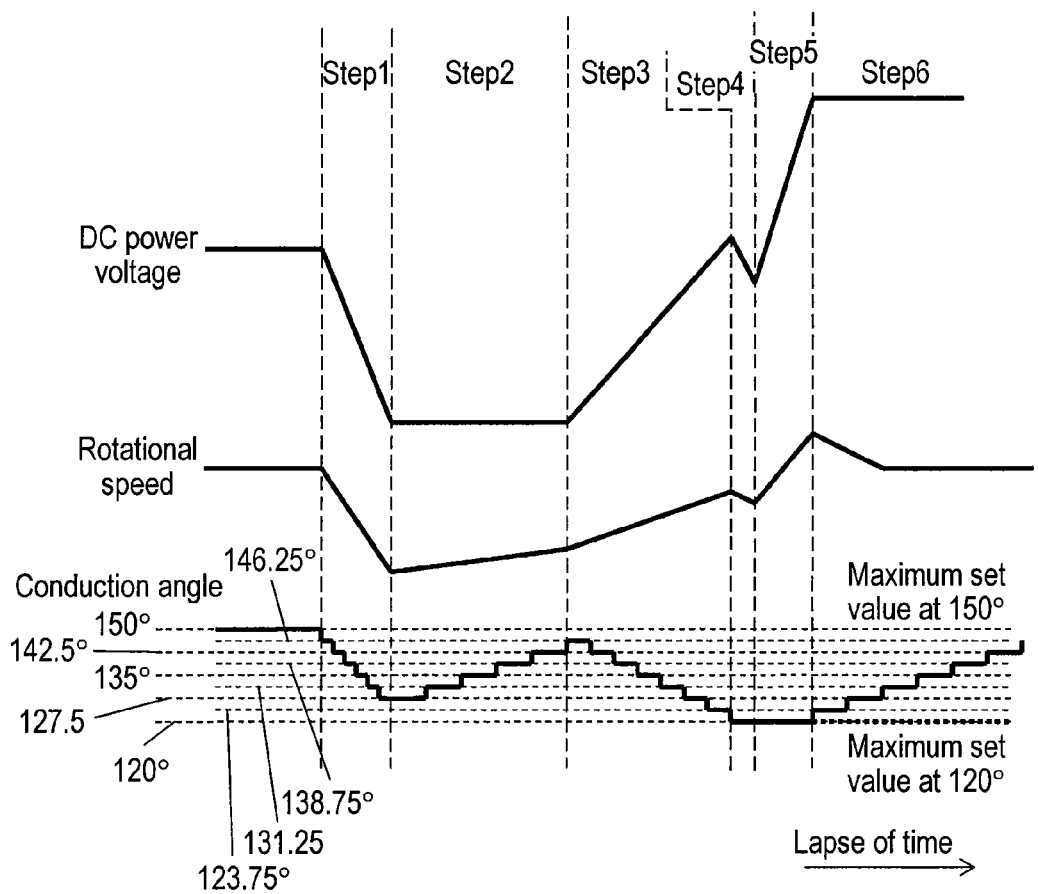
[FIG. 4]

FIG. 1 shows a structure of an inverter controller in accordance with this embodiment of the present invention. FIG. 2 is a timing chart showing waveforms of respective sections in the inverter controller and timing the processes done by the respective sections. FIG. 3 shows characteristics indicating the relation between conduction angles and voltage variations in a power supply of the inverter controller. FIG. 4 is a timing chart showing operation of the inverter controller when a voltage changes in the inverter controller.

As shown in FIG. 1, inverter controller 200 is coupled to commercial AC power supply 201 and brushless DC motor (hereinafter simply referred to as "motor") 204, and drives motor 204. Inverter controller 200 and motor 204 thus form motor driving device 300. Motor 204 includes rotor 204B provided with permanent magnets 204C through 240H. Inverter controller 200 includes inverter circuit 205, position sensing circuit 207, DC voltage sensor 209, and microprocessor 208 having conduction angle controller 217.

Motor 204 has six poles and concentrated windings on salient poles, and is formed of rotor 204B and stator 204A having three-phase windings. Stator 204A has six poles and nine slots, and the number of turns of respective stator windings 204U, 204V, 204W is 189. Rotor 204B includes permanent magnets 204C through 204H therein, and forms an interior-magnets structure which generates reluctance torque.

Inverter controller 200 further has rectifier 203, driving circuit 206. Rectifier 203 converts commercial AC power supply 201 into a DC power supply, and driving circuit 206 drives inverter circuit 205.

Inverter circuit 205 is coupled to and drives motor 204, and is formed of six switching transistors Tru, Trx, Trv, Try, Trw, and Trz coupled together forming a three-phase bridge, and reflux diodes Du, Dx, Dv, Dy, Dw, and Dz respectively coupled in parallel with the switching transistors.

Figure 10:
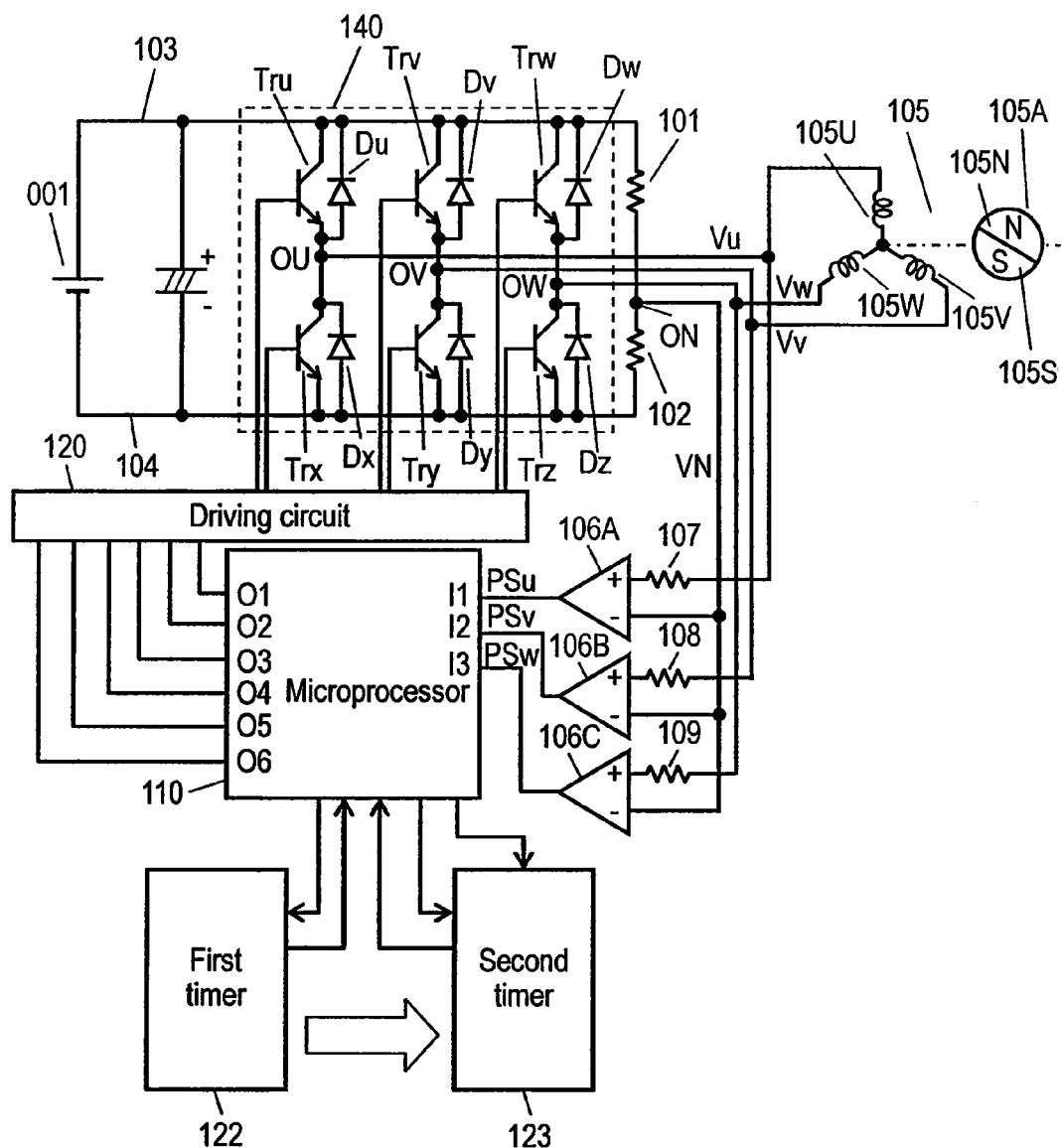
[FIG. 10]
Figure 11:
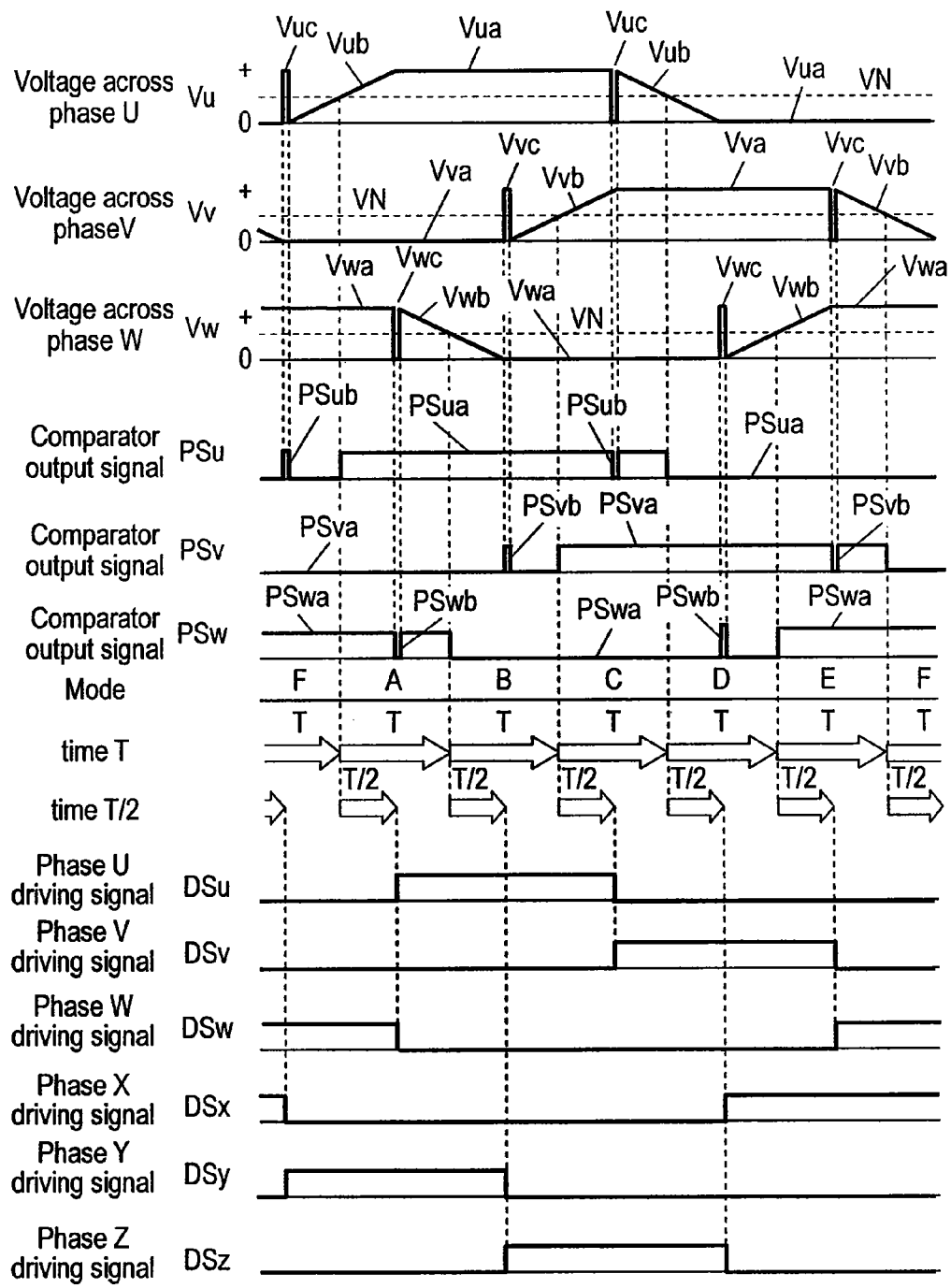
[FIG. 11]
Figure 12:
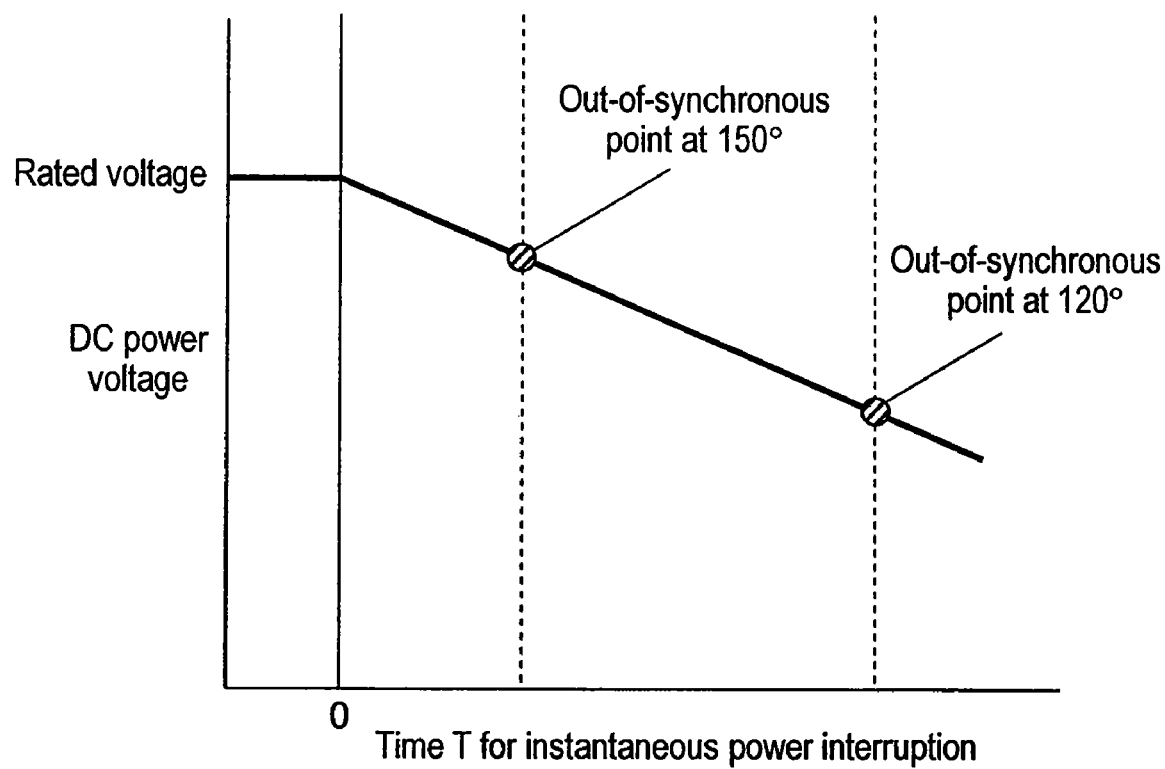
[FIG. 12]

Position sensing circuit 207 senses a position of rotor 204B with respect to stator 204A from an induction voltage of motor 204, and is formed of comparators (not shown) and the like. Circuit 207 compares a terminal voltage signal based on the induction voltage of motor 204 with a reference voltage by the comparators, thereby outputting a position signal of rotor 204B. The structure of circuit 207 is similar to the structure formed of comparators 106A, 106B, 106C shown in FIG. 10.

DC voltage sensor 209 senses a DC power voltage supplied to inverter circuit 205. In other words, sensor 209 senses a voltage converted into a DC form by rectifier 203, and forms a voltage divider circuit using resistors. Sensor 209 outputs the sensed voltage in the form of analog value to microprocessor 208, and it includes a CR filter circuit for reducing noises.

Microprocessor 208 is shown with the block diagrams including respective functions that control inverter circuit 205. These function blocks can be formed of an exclusive circuit, or formed of software built in hardware. To be more specific, microprocessor 208 has rotational speed sensor 210, commutation controller 211, duty setting section 212, PWM controller 213, drive controller 214, and carrier outputting section 215.

Microprocessor 208 further has conduction angle controller 217 which changes a conduction angle in response to a rate of change in the DC power voltage, and conduction angle setting section 218 which sets the maximum value of the conduction angle. As it will be detailed later, conduction angle controller 217 changes the conduction angle of inverter circuit 205 within the range over 0 degree to less than 180 degrees in electric angles in response to the rate of change in the DC power voltage. Microprocessor 208 includes timer 219 for finding a change in voltage per unit time, i.e. the rate of change in the DC power voltage.

The operation and the work of above-discussed respective function blocks of microprocessor 208 in inverter controller 200 are demonstrated hereinafter. Commutation controller 211 calculates a timing of the commutation based on a position signal supplied from position sensing circuit 207, and produces commutation signals for the switching transistors Tru, Trx, Trv, Try, Trw, and Trz.

Rotational speed sensor 210 counts position signals for a certain period, or measures pulse intervals, thereby calculating the rotational speed of motor 204.

Duty setting section 212 makes add-subtract calculations of a duty ratio by using a deviation between the rotational speed obtained by rotational speed sensor 210 and an instructed rotational speed, and supplies the duty ratio to PWM controller 213. A greater duty ratio is supplied PWM controller 213 when an actual rotational speed is lower than the instructed rotational speed, and a smaller duty ratio is supplied when the actual rotational speed is higher than the instructed rotational speed.

Carrier outputting section 215 sets a carrier frequency that switches the switching transistors Tru, Trx, Trv, Try, Trw, and Trz. In this embodiment, the carrier frequency is set between 3 kHz and 10 kHz.

PWM controller 213 outputs a PWM modulated signal based on the carrier frequency set by carrier outputting section 215 and the duty ratio set by duty setting section 212.

Conduction angle controller 217 calculates a rate of change in voltage per unit time with timer 219 based on the DC voltage sensed by DC voltage sensor 209, and controls a conduction angle in inverter circuit 205 to decrease at a greater rate of change in the voltage. In this embodiment, conduction angle controller 217 reads a voltage sensed by DC voltage sensor 209 at a sampling cycle, i.e. every 5 ms, and calculates the rate of change in the DC power voltage. When a little change in the voltages is produced and thus controller 217 determines that no variation is found in the rate of change, controller 217 increases the conduction angle step by step.

Drive controller 214 compounds a commutation signal, a PWM modulated signal, a conduction angle, and a phase advance angle, thereby producing a driving signal, which turns on or off the switching transistors, Tru, Trx, Trv, Try, Trw, and Trz, and outputs this driving signal to driving circuit 206. Driving circuit 206 then turns on or off the switching transistors, Tru, Trx, Trv, Try, Trw, and Trz, based on the driving signal, thereby driving motor 204.

Next, various waveforms of inverter controller 200 are described hereinafter with reference to FIG. 2. Inverter controller 200 controls motor 204 with the conduction angle set at 150 degrees and the phase advance angle set at 15 degrees in electric angles. Conduction angle setting section 218 sets the maximum conduction angle at 150 degrees, and minimum conduction angle at 120 degrees.

As shown in FIG. 2, respective phases of terminal voltage Vu across phase U, terminal voltage Vv across phase V, and terminal voltage Vw across phase W of motor 204 shift by 120 degrees from each other, and these phases move with this 120 degrees maintained. Assume that inverter circuit 205 supplies voltages Vua, Vva, and Vwa to stator windings 204U, 204V, and 204W, and these windings generate induction voltages Vub, Vvb, and Vwb, respectively. Assume that any one of reflux diodes Du, Dx, Dv, Dy, Dw, and Dz of inverter circuit 205 becomes conductive at a switching event of the commutation, thereby producing pulse-like spike voltages Vuc, Vvc, Vwc. Then terminal voltages Vu, Vv, Vw shape waveforms which are combined by supplied voltages Vua, Vva, Vwa, induction voltages Vub, Vvb, Vwb, and spike voltages Vuc, Vvc, Vwc. The comparators compare terminal voltages Vu, Vv, Vw with voltage VN at a virtual neutral point, i.e. a half of the voltage produced by the DC power supply, and outputs signals PSu, PSv, PSw.

In the foregoing condition, when the DC power voltage abruptly lowers, an actual rotational speed of motor 204 lowers in proportion to the rate of change in the DC power voltage. The cross-point, where the induction voltage crosses voltage VN of the virtual neutral point, fades into the conduction period. In a similar way, when the DC power voltage abruptly rises, the actual rotational speed of motor 204 sharply increases, and the cross point fades into the spike voltages. Either of these events invites an erroneous sense of pole position of the rotor, and incurs the out-of-synchronous.

To overcome the foregoing problem, this embodiment of the present invention, as shown in FIG. 3, allows DC voltage sensor 209 to sense a change in the DC power voltage, and allows conduction angle controller 217 to calculate a rate of change in the DC power voltage every 5 ms, i.e. the cycle of timer 219, thereby determining a conduction angle. Conduction angle controller 217 decreases the conduction angle as the change in the DC power voltage becomes greater, and also decreases the conduction angle as a variation time becomes longer. The conduction angle is thus changed in response to the rate of change in the DC voltage, so that motor 204 can be more stably. As shown in FIG. 3, assume that the rate of change in the DC power voltage is 100V/second, 200V/second, or 300V/second, and then the DC power voltage stays stable at reference voltage E0 and at conduction angle 150 degrees until reference time reaches "t0".

From time "t0", the DC power voltage starts varying. Since conduction angle controller 217 senses the DC power voltage with timer 219 every 5 ms, controller 217 can calculate the rate of change in the voltages at point "t1", "t2", "t3", and onward at intervals of every 5 ms.

In this embodiment, the minimum resolution of the conduction angle is set at 3.75 degrees in electrical angles, so that when the rate of change is 100V/second, the conduction angle decreases by 3.75 degrees every 10 ms, and in the case of 200V/second, it decreases by 3.75 degrees every 5 ms, and in the case of 300V/second, it decreases by 11.25 degrees in 10 ms.

Next, the operation of inverter controller 200 during a variation in voltages, e.g. during an instantaneous power interruption, is described with reference to FIG. 4. When motor 204 is in an initial state, motor 204 is under a heavy load and rotates at a high rotational speed. When an abrupt fall of the DC power voltage occurs (Step 1), conduction angle controller 217 reduces the conduction angle from 150 degrees to 127.5 degrees in response to the rate of change in the DC power voltage. The reduction in the conduction angle allows enlarging the position sensible period, so that position sensing circuit 207 will not lose the pole position of the rotor in the conduction period. As a result, the out-of-synchronous due to a change in voltages can be prevented.

In the next case, after the abrupt fall of the DC power voltage, the DC power voltage stays steadily at a low voltage (Step 2). In this condition, conduction angle controller 217 widens the conduction angle step by step (every 100 ms), and then after a lapse of 500 ms, the conduction angle increases from 127.5 degrees to 142.5 degrees. In this case, the output becomes low due to a low voltage, so that a wider conduction angle is needed for increasing the output. Conduction angle controller 217 thus tries to increase the angle to the maximum angle, i.e. 150 degrees. In other words, when the DC power voltage is stable, conduction angle controller 217 increases the conduction angle step by step to the value set by conduction angle setting section 218. In such a case, since no variation in the rotation occurs, wide-angle operation is achievable, and the conduction angle can be restored to the given value when the voltage becomes stable. As a result, motor 204 can work again at a high rotational speed and produce again large torque.

When the DC voltage sharply rises from the stable condition (Step 3), conduction angle controller 217 changes the conduction angle from 142.5 degrees to 120 degrees. In other words, when the DC power voltage rises at a given rate of change or over that given rate, controller 217 reduces the conduction angle in response to the rate of change in the DC power voltage. This is similar to the case when the DC power voltage sharply falls. The position sensible period thus can be enlarged, so that position sensing circuit 207 will not lose the pole position of the rotor in the spike voltage. As a result, motor 204 is prevented from falling in the out-of-synchronous caused by the change in rotation due to an increase in voltage.

When the DC power voltage varies up and down (Step 4), conduction angle controller 217 controls the conduction angle to decrease. When conduction angle stays at 120 degrees in electric angles and the DC power voltage still varies (Step 5), conduction angle controller 217 maintains the conduction angle at 120 degrees, i.e. the minimum set value.

When the DC power voltage steadily stays at a high voltage (Step 6), conduction angle controller 217 increases the conduction angle to the given value, i.e. 150 degrees (maximum set value). However, since the high voltage allows outputting high power, the maximum set value can be as small as 120 degrees.

The maximum conduction angle can be set in response to the duty ratio, rotational speed, and DC power voltage.

In this embodiment, rotor 204B employs interior permanent magnets 204C through 204H, and has salient-pole properties, so that motor 204 can produce reluctance torque. In this case, a phase advance control is carried out in order to efficiently use the reluctance torque; however, use of this phase advance control together with the wide-angle control will further reduce the position sensible period. This embodiment yet proves that the phase advance control in addition to the wide-angle control will reduce events of the out-of-synchronous caused by changes in voltage, so that the resistance to the instantaneous power interruption can be increased.

Use of stator 204A having a greater number of turns will increase the inductance, thereby widening the width of the spike voltage, so that the position sensible period decreases. To be more specific, in the case of over 160 turns of the stator winding, this phenomenon appears conspicuously. However, this embodiment prevents such a motor from falling in the out-of-synchronous caused by changes in voltage, so that the resistance to the instantaneous power interruption can be increased.

Motor 204 having six poles or more than six poles is obliged to encounter a difficulty of sensing a rotor position comparing with a conventional motor having four poles, because the increase in the number of poles reduces the position sensible period due to an issue of mechanical angle. However, this embodiment prevents motor 204 having six poles or more than six poles from falling in the out-of-synchronous caused by changes in voltage, so that the resistance to the instantaneous power interruption can be increased.

In this embodiment, the conduction angles changes from 150 degrees to 120 degrees step by step through nine steps; however, the rate of change in the DC power voltage and the conduction angle can be changed linearly, and a sampling cycle of the DC power voltage can be set at any value. On top of that, use of the conduction angle less than 120 degrees will make the system more resistible to the changes in power voltage or the instantaneous power interruption.

Figure 5:
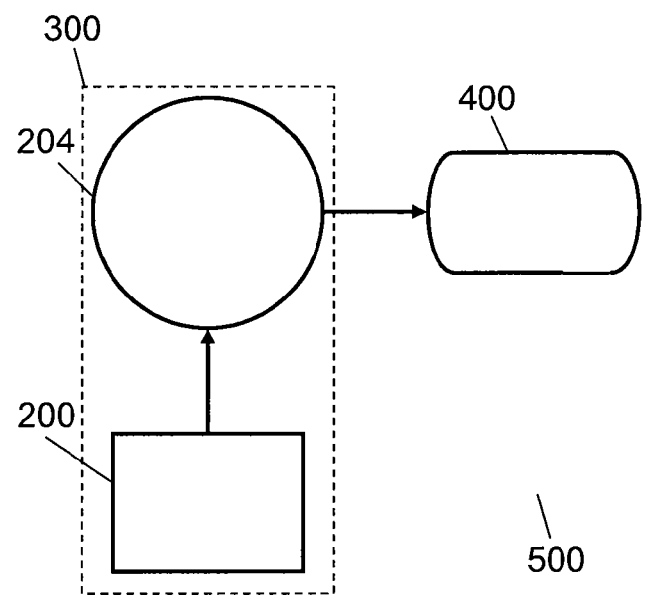
[FIG. 5]
Figure 6:
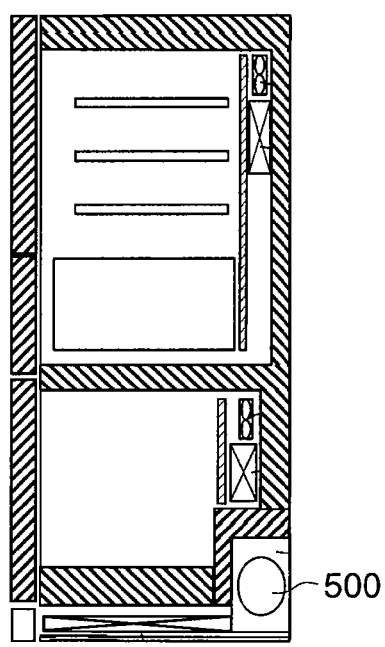
[FIG. 6]
Figure 7:
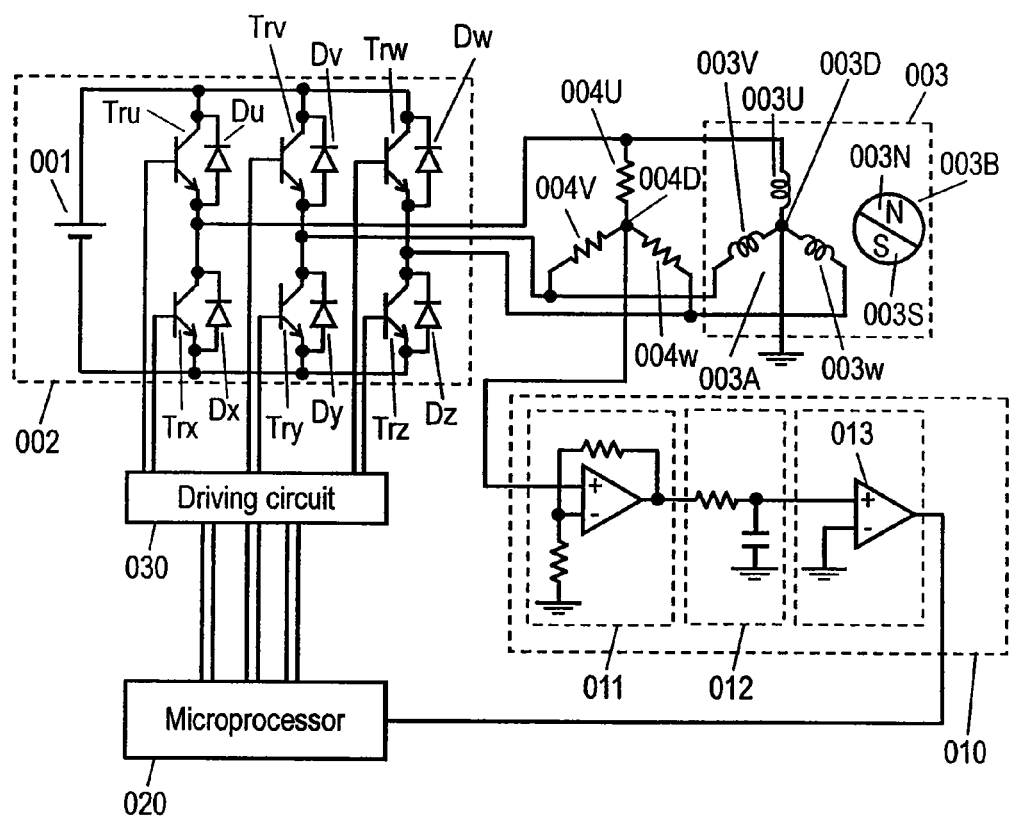
[FIG. 7]
Figure 8:
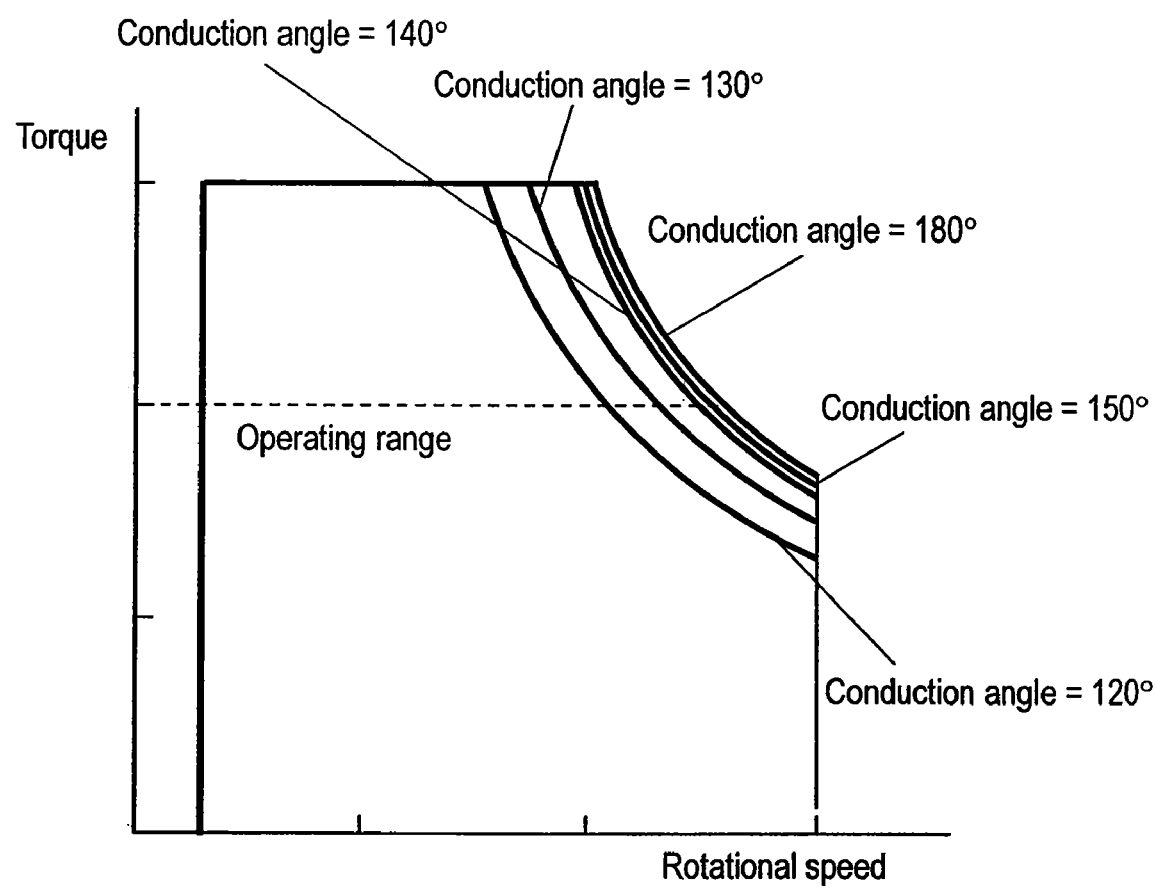
[FIG. 8]
Figure 9:
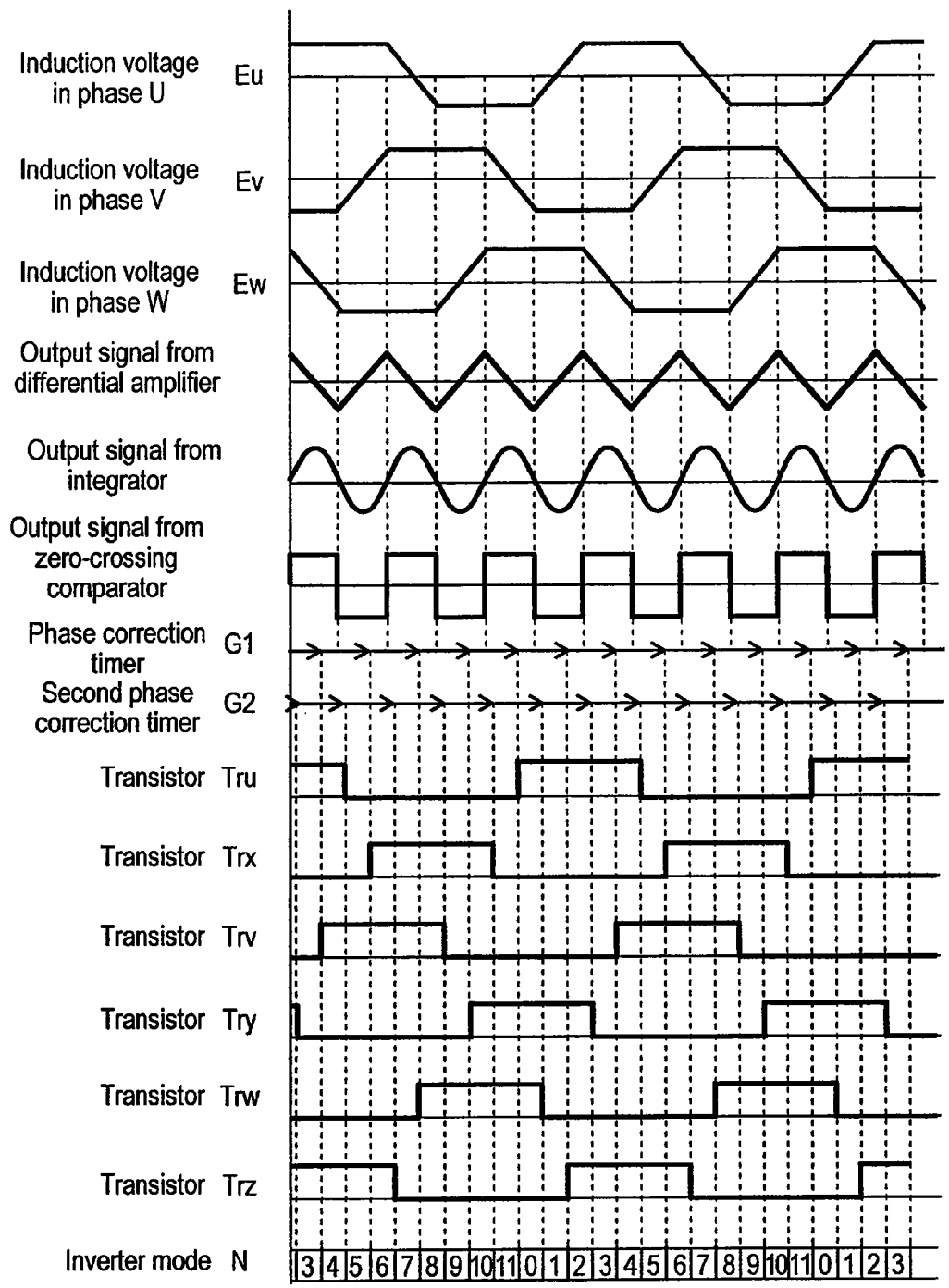
[FIG. 9]

As shown in FIG. 5, inverter controller 200 and motor 204 form motor driving device 300, and motor driving device 300 and compressing section 400 form electric compressor 500. Motor driving device 300 drives compressing section 400, which is a driven body. Compressor 500 thus can prevent motor 204 from falling in the out-of-synchronous caused by changes in voltage, and it also can make motor 204 more resistible to the instantaneous power interruption, thereby increasing the reliability. In addition, as shown in FIG. 6, electric home appliances, such as refrigerators, can use compressor 500, or motor driving device 300 can be used for driving a motor of washing machines. In the later case, a pulsator or a rotary drum is driven by motor driving device 300. The use of motor driving device 300 in electric home appliances discussed above assures excellent operation of the appliances.

[Industrial Applicability]

The inverter controller of the present invention can sense a magnetic pole position of the rotor without losing the pole positions of the rotor even if a change in the power voltage occurs. The inverter controller is useful in electric home appliances such as air-conditioners, refrigerators, and washing machines and electric vehicles encountering changes in the power voltage. It is also useful in the regions where changes in the power voltage often occur.

The invention claimed is:

1. An inverter controller for driving a brushless DC motor having a stator and a rotor which includes permanent magnets, the inverter controller comprising:
   an inverter circuit coupled to the brushless DC motor configured to drive the brushless DC motor;
   a position sensing circuit configured to sense a position of the rotor with respect to the stator from an induction voltage of the brushless DC motor;
   a DC voltage sensor configured to sense a voltage value of a DC power voltage supplied to the inverter circuit; and
   a conduction angle controller configured to change a conduction angle of the inverter circuit within a range from over 0 degree to less than 180 degrees in electric angles in response to a rate of change in the DC power voltage.

2. The inverter controller according to claim 1,
   wherein the conduction angle controller reduces the conduction angle in response to the rate of change in the DC power voltage when the DC power voltage lowers at a given rate of change or more.

3. The inverter controller according to claim 2,
   wherein the conduction angle controller reduces the conduction angle at a greater rate of change in the DC power voltage.

4. The inverter controller according to claim 1,
   wherein the conduction angle controller reduces the conduction angle in response to the rate of change in the DC power voltage when the DC power voltage rises at a given rate of change or more.

5. The inverter controller according to claim 4,
   wherein the conduction angle controller reduces the conduction angle at a greater rate of change in the DC power voltage.

6. The inverter controller according to claim 1 further comprising a conduction angle setting section configured to set the conduction angle,
   wherein the conduction angle controller increases the conduction angle step by step to a value set by the conduction angle setting section when the DC power voltage stays stable.

7. A motor driving device comprising:
   the inverter controller as defined in claim 1; and
   the brushless DC motor driven by the inverter circuit of the inverter controller.

8. The motor driving device according to claim 7,
   wherein the rotor of the brushless DC motor includes the permanent magnets embedded therein, and has salient-pole properties.

9. The motor driving device according to claim 7,
   wherein the brushless DC motor includes stator windings of which number of turns is at least 160.

10. The motor driving device according to claim 7,
    wherein the brushless DC motor has six poles or more.

11. An electric compressor comprising:
    the inverter controller as defined in claim 1;
    the brushless DC motor driven by the inverter circuit of the inverter controller; and
    a compressor section driven by the brushless DC motor.

12. An electric home appliance comprising:
    the inverter controller as defined in claim 1;
    the brushless DC motor driven by the inverter circuit of the inverter controller; and
    a driven body driven by the brushless DC motor.

* * * * *